US012682779B2

(12) United States Patent　　　(10) Patent No.:　US 12,682,779 B2

Kumagai et al.　　　(45) Date of Patent:　　Jul. 14, 2026

(54) INFORMATION COMMUNICATION APPARATUS, STORAGE MEDIUM, AND COMMUNICATION SYSTEM

(71) Applicant: CASIO COMPUTER CO., LTD., Tokyo (JP)

(72) Inventors: Ryo Kumagai, Tokyo (JP); Masaaki Yanagisawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/680,405

(22) Filed: May 31, 2024

(65) Prior Publication Data

US 2024/0404419 A1　　Dec. 5, 2024

(30) Foreign Application Priority Data

May 31, 2023　(JP) ................................. 2023-089654

(51) Int. Cl.
*G09B 7/02*　　　(2006.01)
*G06F 15/02*　　(2006.01)
*H04L 1/08*　　　(2006.01)
*H04L 12/18*　　(2006.01)

(52) U.S. Cl.
CPC ........... *G09B 7/02* (2013.01); *G06F 15/0208* (2013.01); *H04L 1/08* (2013.01); *H04L 12/1868* (2013.01)

(58) Field of Classification Search
CPC ......... G09B 7/02; G06F 15/0208; H04L 1/08; H04L 12/1868
See application file for complete search history.

(56) References Cited

U.S. PATENT DOCUMENTS

| | | | | |
|---|---|---|---|---|
| 7,864,688 B2 * | 1/2011 | Yakushiji | ................ | H04L 43/50 370/242 |
| 11,575,475 B2 * | 2/2023 | Dudda | ................. | H04L 1/1614 |
| 2005/0078678 A1 * | 4/2005 | Kim | ................... | H04L 12/1868 370/432 |
| 2010/0254262 A1 * | 10/2010 | Kantawala | .............. | H04L 47/15 370/232 |
| 2014/0376387 A1 * | 12/2014 | Shin | ...................... | H04W 24/04 370/245 |
| 2017/0180076 A1 * | 6/2017 | Finlow-Bates | ....... | H04L 1/0083 |
| 2019/0207766 A1 * | 7/2019 | Sanghvi | ............... | H04L 9/3239 |
| 2021/0075550 A1 * | 3/2021 | Jeon | ...................... | H04L 1/1628 |
| 2022/0353741 A1 * | 11/2022 | Xie | ...................... | H04L 1/0026 |

FOREIGN PATENT DOCUMENTS

| | | |
|---|---|---|
| JP | H09-034344 A | 2/1997 |
| JP | 2017-174189 A | 9/2017 |
| JP | 2017-175425 A | 9/2017 |

\* cited by examiner

*Primary Examiner* — Eddy Saint-Vil

(74) *Attorney, Agent, or Firm* — Scully, Scott, Murphy & Presser, P.C.

(57) ABSTRACT

An information communication apparatus includes a communicator and a processor. In response to the communicator receiving, from a source, reception information that is information on reception of predetermined information by the source, the processor determines whether transmission information that is information on transmission of the predetermined information by the information communication apparatus matches the reception information.

12 Claims, 7 Drawing Sheets

INFORMATION COMMUNICATION APPARATUS, STORAGE MEDIUM, AND COMMUNICATION SYSTEM

REFERENCE TO RELATED APPLICATIONS

This application is based upon and claims the benefit of priority from the prior Japanese Patent Application No. 2023-089654, filed on May 31, 2023, the entire content, including the description, claims and drawings, of which is incorporated herein by reference.

TECHNICAL FIELD

The present disclosure relates to an information communication apparatus, a storage medium and a communication system.

DESCRIPTION OF RELATED ART

In JP 2017-174189 A, a communication technique between a scientific electronic calculator for a teacher, a scientific electronic calculator for a student and a tablet terminal is disclosed. The teacher's scientific electronic calculator and the student's scientific electronic calculator are in a wirelessly interconnected environment, the teacher's scientific electronic calculator and the tablet terminal are in a wirelessly interconnected environment, and the student's scientific electronic calculator and the tablet terminal are in a wirelessly interconnected environment. When the teacher enters problem data into the teacher's scientific electronic calculator, the problem data is either transmitted directly from the teacher's scientific electronic calculator to the student's scientific electronic calculator or transmitted from the teacher's scientific electronic calculator to the student's scientific electronic calculator via the tablet terminal. When the student enters an answer to the problem into the student's scientific electronic calculator, the answer data is transmitted from the student's scientific electronic calculator to the terminal tablet.

SUMMARY OF THE INVENTION

According to an aspect of the present disclosure, there is provided an information communication apparatus including:

a communicator; and a processor, wherein in response to the communicator receiving, from a source, reception information that is information on reception of predetermined information by the source, the processor determines whether transmission information that is information on transmission of the predetermined information by the information communication apparatus matches the reception information.

According to another aspect of the present disclosure, there is provided a non-transitory computer-readable storage medium storing a program that causes a computer of an information communication apparatus including a communicator to:

in response to the communicator receiving, from a source, reception information that is information on reception of predetermined information by the source, determine whether transmission information that is information on transmission of the predetermined information by the information communication apparatus matches the reception information.

According to another aspect of the present disclosure, there is provided a communication system including:

at least one first information communication apparatus including a first communicator and a first processor; and a second information communication apparatus including a second communicator and a second processor, wherein in response to the second communicator receiving transmission information that is second status information on transmission of predetermined information by each of the at least one first information communication apparatus, the second processor generates reception information based on the transmission information for each of the at least one first information communication apparatus, the reception information being first status information on reception of the predetermined information by the second information communication apparatus, wherein the second processor causes the second communicator to periodically transmit the reception information regarding all the at least one first information communication apparatus, wherein in response to the first communicator receiving the reception information, the first processor compares the transmission information with the reception information, and wherein in response to the transmission information not matching the reception information, the first processor causes the first communicator to retransmit the predetermined information.

According to another aspect of the present disclosure, there is provided a non-transitory computer-readable storage medium storing a program that causes a computer of an information communication apparatus including a communicator to:

in response to the communicator receiving transmission information that is second status information on transmission of predetermined information by each of at least one other apparatus, generate reception information based on the transmission information for each of the at least one other apparatus, the reception information being first status information on reception of the predetermined information by the information communication apparatus; and cause the communicator to periodically transmit the reception information regarding all the at least one other apparatus.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter one or more embodiments will be described with reference to the drawings. Features and technical effects of the embodiments will be understood from the following detailed description and the drawings. However, the scope of the present disclosure is not limited to the embodiments disclosed below. The drawings are provided for illustrative purposes only, and therefore the scope of the present disclosure is not limited to the illustrated examples either.

Hereinafter ordinal numbers, such as "first" and "second", may be attached to objects having the same name. The ordinal numbers are used for distinguishing objects provided with the same name from one another only, and not intended to limit such objects to the definite objects or specify the order, ranking, sequence, classes, priority, inferiority and so forth of the objects.

The term "broadcast" indicates that a source apparatus transmits information to an apparatus(es) around the source apparatus without specifying a destination apparatus.

The term "scan" indicates that a destination apparatus turns to be in a state of being able to receive information broadcast from a source apparatus.

Figure 1:
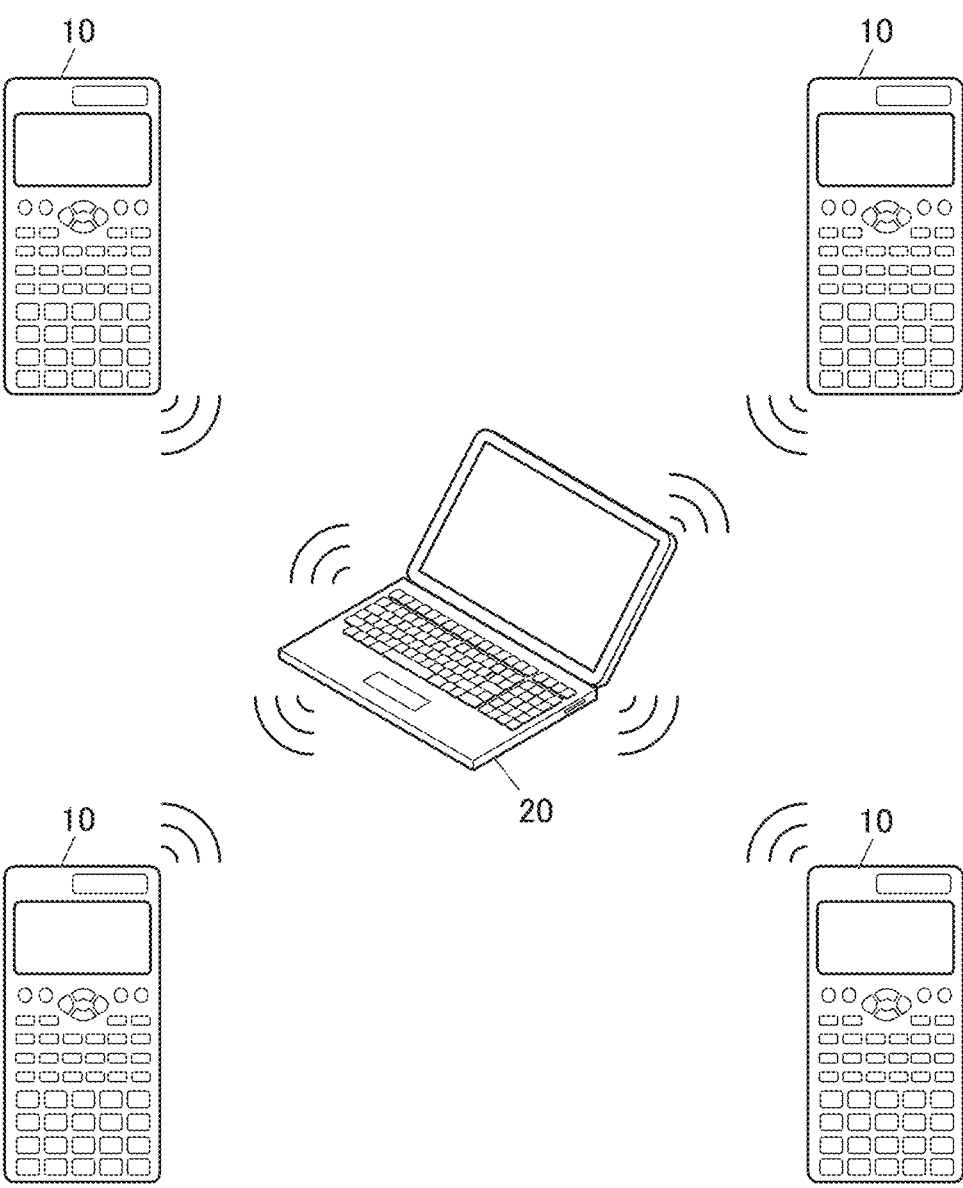
FIG. 1 shows overall configuration of a communication system.

FIG. 1 is a block diagram showing overall configuration of a communication system. The communication system includes a plurality of first information communication apparatuses 10 and a second information communication apparatus 20. Hereinafter the first information communication apparatuses 10 are each referred to as a child unit 10, and the second information communication apparatus 20 is referred to as a parent unit 20.

The child units 10 and the parent unit 20 are each configured to be capable of short-range wireless communication in accordance with a standard that realizes a communication distance of up to 100 m or so. Examples of the standard for the communication between the parent unit 20 and the child units 10 include Bluetooth® Low Energy abbreviated as BLE, Wi-Fi®, and ZigBee®. Hereinafter the parent unit 20 and the child units 10 configured to be capable of wireless communication in accordance with the BLE standard will be detailed as examples.

Between the child units 10 and the parent unit 20, interconnection in the BLE standard is not established. In other words, the child units 10 and the parent unit 20 do not form a connected network topology.

The communication system is used in a local area. Examples thereof include an educational site, a training site, a lecture site, and an examination site. When a preparer, such as a teacher, a lecturer or an examiner, broadcasts a problem using the parent unit 20, answerers, such as pupils, students, lecture-takers or examinees, each receive the problem using their own child units 10. The answerers solve the problem and enter their answers into their respective child units 10. When the answerers broadcast their answers using their respective child units 10, the preparer receives the answers using the parent unit 20.

However, since two or more child units 10 broadcast answers, the parent unit 20 may fail to receive an answer(s) broadcast by some (one or more) of the child units 10 due to radio interference or the like. In the present disclosure, if the parent unit 20 fails to receive an answer, the child unit 10 that has broadcast the answer rebroadcasts the answer without the preparer and the answerer operating the parent unit 20 and the child unit 10, respectively, whereas if the parent unit 20 successfully receives an answer, the child unit 10 that has broadcast the answer does not retransmit (rebroadcast) the answer. In order to achieve these, the child units 10 and the parent unit 20 are configured as follows.

Each child unit 10 is a scientific electronic calculator. The child unit 10 may not be a scientific electronic calculator but another computer system, such as an electronic dictionary, a cellular phone, a smartphone, a tablet computer system or a laptop computer system.

Figure 2:
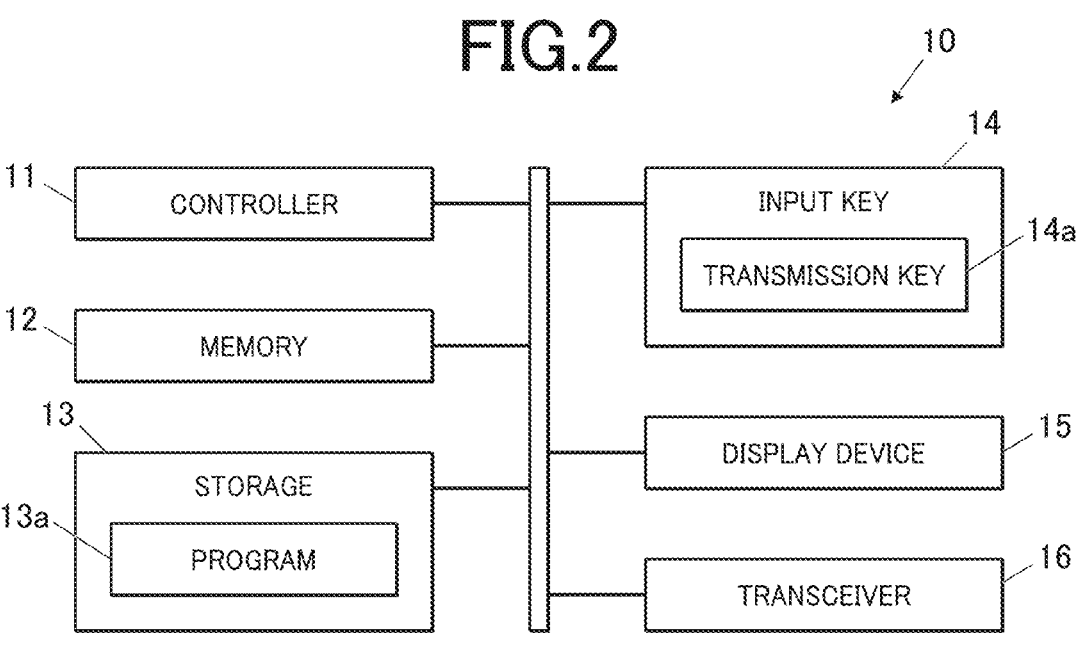
FIG. 2 is a block diagram of each first information communication apparatus.

FIG. 2 is a block diagram of each child unit 10. The child unit 10 includes a controller 11, a memory 12, a storage 13, an input key (input key group) 14, a display device 15, and a transceiver 16. The child unit 10 may include components other than those shown in FIG. 2.

The controller 11 includes at least one processor, such as a central processing unit (CPU). The controller 11 performs various types of arithmetic processing and is in charge of the overall control of the child unit 10.

The memory 12 includes a RAM as a volatile memory, as at least one memory. The memory 12 provides the controller 11 with a storage area and a work area for the controller 11 to perform arithmetic processing and temporarily store data.

The storage 13 includes a ROM as a nonvolatile memory, as at least one memory. The storage 13 may be a data writable/erasable memory. The storage 13 stores programs for various calculation functions of the controller 11. The storage 13 stores values of various constants that are used by the controller 11 in functional calculus or the like. The storage 13 stores a program 13a executable by the controller 11.

The input key 14 includes a plurality of push keys that can be pressed. When the answerer (user of the child unit 10) presses a push key, a signal corresponding to the push key is transferred from the input key 14 to the controller 11, and the controller 11 recognizes an input or a command corresponding to the push key. The push keys include a transmission key 14a, numerical value keys, arithmetic operation keys, a calculation execution key, and function keys. The transmission key 14a is for instructing the controller 11 to perform transmission, namely, for generating a transmission command to be given to the controller 11. The transmission key 14a may be used for instructing the controller 11 to perform a process other than transmission. The numerical value keys are for causing the controller 11 to recognize inputs of numerical values. The arithmetic operation keys are for causing the controller 11 to recognize inputs of arithmetic operators. The calculation execution key is for instructing the controller 11 to start calculation. The function keys are for causing the controller 11 to perform specific functions.

The display device 15 includes a display device, such as a liquid crystal display device or an organic electroluminescence (EL) display device. The display device 15 may be either of a color display type or a monochromatic display type.

The transceiver 16 is a wireless communication module as a communicator. The transceiver 16 includes an antenna, a transmitter, a receiver, and a controller. The transceiver 16 conforms to the BLE standard. The transceiver 16 modulates a packet generated by the controller 11 into a high-frequency signal and transmits the high-frequency signal as a transmission radio wave (i.e., radio wave to be transmitted). Further, the transceiver 16 receives a reception radio wave (i.e., radio wave to be received) of a high-frequency signal, demodulates the reception radio wave into a packet, and transfers information contained in the packet to the controller 11.

The parent unit 20 is a laptop computer system. The parent unit 20 may not be a laptop computer system but another computer system, such as a smartphone, a tablet computer system or a desktop computer system.

Figure 3:
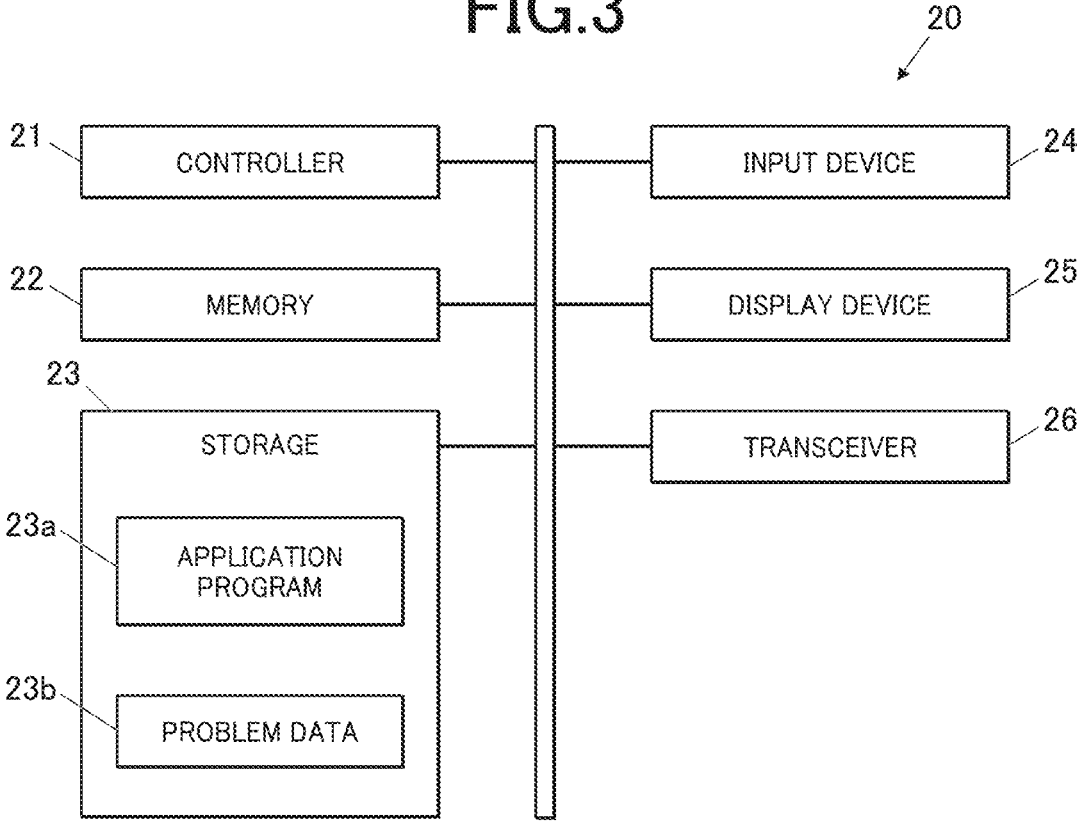
FIG. 3 is a block diagram of a second information communication apparatus.

FIG. 3 is a block diagram of the parent unit 20. The parent unit 20 includes a controller 21, a memory 22, a storage 23, an input device 24, a display device 25, and a transceiver 26. The parent unit 20 may include components other than those shown in FIG. 3.

The controller 21 includes a processor, such as a central processing unit (CPU). The controller 21 may have two or more processors. The controller 21 performs various types of arithmetic processing and is in charge of the overall control of the parent unit 20.

The memory 22 includes a RAM as a volatile memory. The memory 22 provides the controller 21 with a storage area and a work area for the controller 21 to perform arithmetic processing and temporarily store data.

The storage 23 includes a storage device, such as a semiconductor storage device or a magnetic storage device. The storage e 23 stores various programs that constitute an operating system (OS), and the OS is installed in the parent unit 20. The OS may be a general-purpose OS, such as Windows®, Android®, iOS®, macOS®, Linux® or Unix®. The storage 23 stores an application program 23*a* executable on the OS, and the application program 23*a* is installed in the parent unit 20. The storage 23 stores a plurality of problem data 23*b* usable in the application program 23*a*.

The input device 24 includes a device(s), such as a touchscreen, a mouse, a touchpad, a stylus, a pointing device, a keyboard, keys, and/or push buttons. When the preparer (user of the parent unit 20) performs a gesture, such as a press, move, slide, drag, drop, click, multi-click, touch, multi-touch, tap, multi-tap or swipe, on/with the input device 24, the controller 21 recognizes and obtains input information or a command corresponding to the gesture.

The display device 25 includes a display device, such as a liquid crystal display device or an organic electroluminescence (EL) display device. The controller 21 generates a graphical screen for realizing a graphical user interface (GUI) and outputs a video signal of the graphical screen to the display device 25. The display device 25 displays the graphical screen in accordance with the video signal.

The transceiver 26 is a wireless communication module as a communicator. The transceiver 26 includes an antenna, a transmitter, a receiver, and a controller. The transceiver 26 conforms to the BLE standard. The transceiver 26 modulates a packet generated by the controller 21 into a high-frequency signal and transmits the high-frequency signal as a transmission radio wave. Further, the transceiver 26 receives a reception radio wave of a high-frequency signal, demodulates the reception radio wave into a packet, and transfers information contained in the packet to the controller 21.

Figure 4:
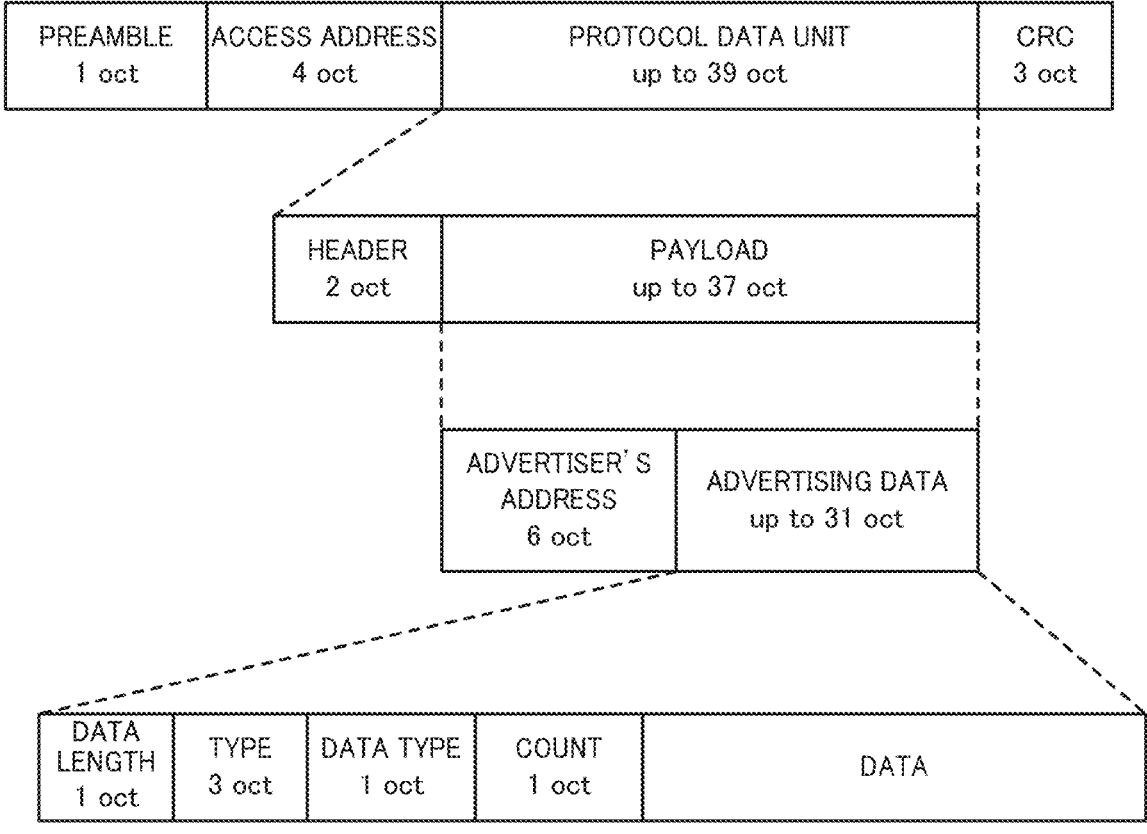
FIG. 4 shows the structure of a packet that is broadcast by each first information communication apparatus or the second information communication apparatus.

FIG. 4 shows the structure of a packet that is transmitted in accordance with the BLE standard.

The packet shown in FIG. 4 is an advertising packet that is transmitted when interconnection between the parent unit 20 and the child unit(s) 10 is not established. This packet includes a one-octet preamble field, a four-octet access address field, a protocol data unit (PDU) field variable in the range of two to 39 octets, and a three-octet cyclic redundancy checksum (CRC) field. The data length of the packet is ten to 47 octets, depending on the data length of the PDU field.

In the preamble field, a numerical value used for synchronization at a destination is stored. In the access address field, a numerical value used for determination of the packet at the destination for synchronization at the destination is stored. In the CRC field, a numerical value used for detection of an error in reception is stored.

The PDU field includes a two-octet header field and a payload field variable in the range of six to 37 octets. The header field includes a field where the type of the PDU data is stored, a field where presence or absence of a transmitting/sending address (source address) in the payload is stored, a field where presence or absence of a receiving address (destination address) in the payload is stored, a field where the data length of the payload field is stored, and a field with no defined use.

The payload field includes a six-octet advertiser's address field and an advertising data field of up to 31 octets. In the advertiser's address field, identification information identifying a source is stored. The advertising data field includes a one-octet data length field, a three-octet type field, a one-octet data type field, a one-octet count field, and a data field of up to 25 octets. In the data length field, the data length of the advertising data field or the data field is stored. In the type field, a determined value such as identification information on a manufacturer is stored. The value stored in the type field is used for determining whether the packet has been transmitted by one of the parent unit 20 and the child units 10. In other words, on the basis of the value stored in the type field, the controller 11 of each child unit 10 can determine whether or not the packet received by the transceiver 16 has been transmitted from either another child unit 10 or the parent unit 10, or the controller 21 of the parent unit 20 can determine whether or not the packet received by the transceiver 26 has been transmitted from one of the child units 10.

In the data type field, data indicating the role or the transmission direction of the packet in a communication protocol is stored. Examples of definition represented by the data stored in the data type field include "Registration of Child Unit", "From Parent Unit to Child Unit", "From Child Unit to Parent Unit", and "Periodic Broadcasting". If each child unit 10 broadcasts a packet containing a number assigned to an answerer (user of the child unit 10), a value defining "Registration of Child Unit" is in the data type field of the packet. Hereafter this packet is referred to as a "registration packet". If the parent unit 20 broadcasts a packet containing problem data or the like, a value defining "From Parent Unit to Child Unit" is in the data type field of the packet. Hereinafter this packet is referred to as a "first packet". If each child unit 10 broadcasts a packet containing predetermined information, such as answer data, a value defining "From Child Unit to Parent Unit" is in the data type field of the packet. Hereinafter this packet is referred to as a "second packet". If the parent unit 20 broadcasts a packet containing reception status data, a value defining "Periodic Broadcasting" is in the data type field of the packet. Hereafter this packet is referred to as a "periodic packet". In other words, the controller 11 of each child unit 10 and the controller 21 of the parent unit 20 can determine which type the packet received by their respective transceivers 16, 26 is, the registration packet, the first packet, the second packet or the periodic packet, on the basis of the value stored in the data type field of the received packet.

Figure 5:
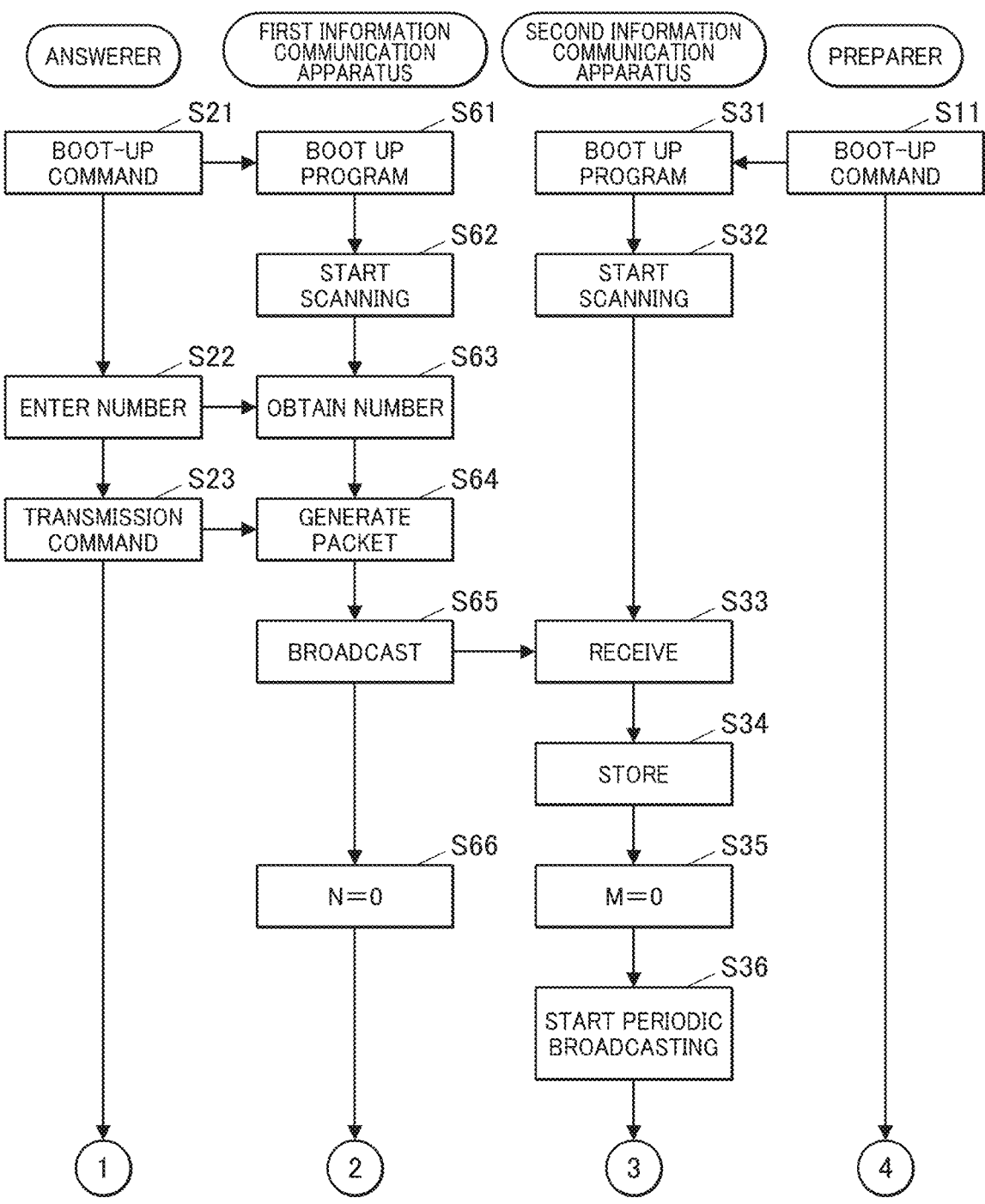
FIG. 5 shows a sequence of actions that are performed by a preparer, a sequence of actions that are performed by each answerer, a sequence of processes that are performed by a controller of each first information communication apparatus, and a sequence of processes that are performed by a controller of the second information communication apparatus.
Figure 6:
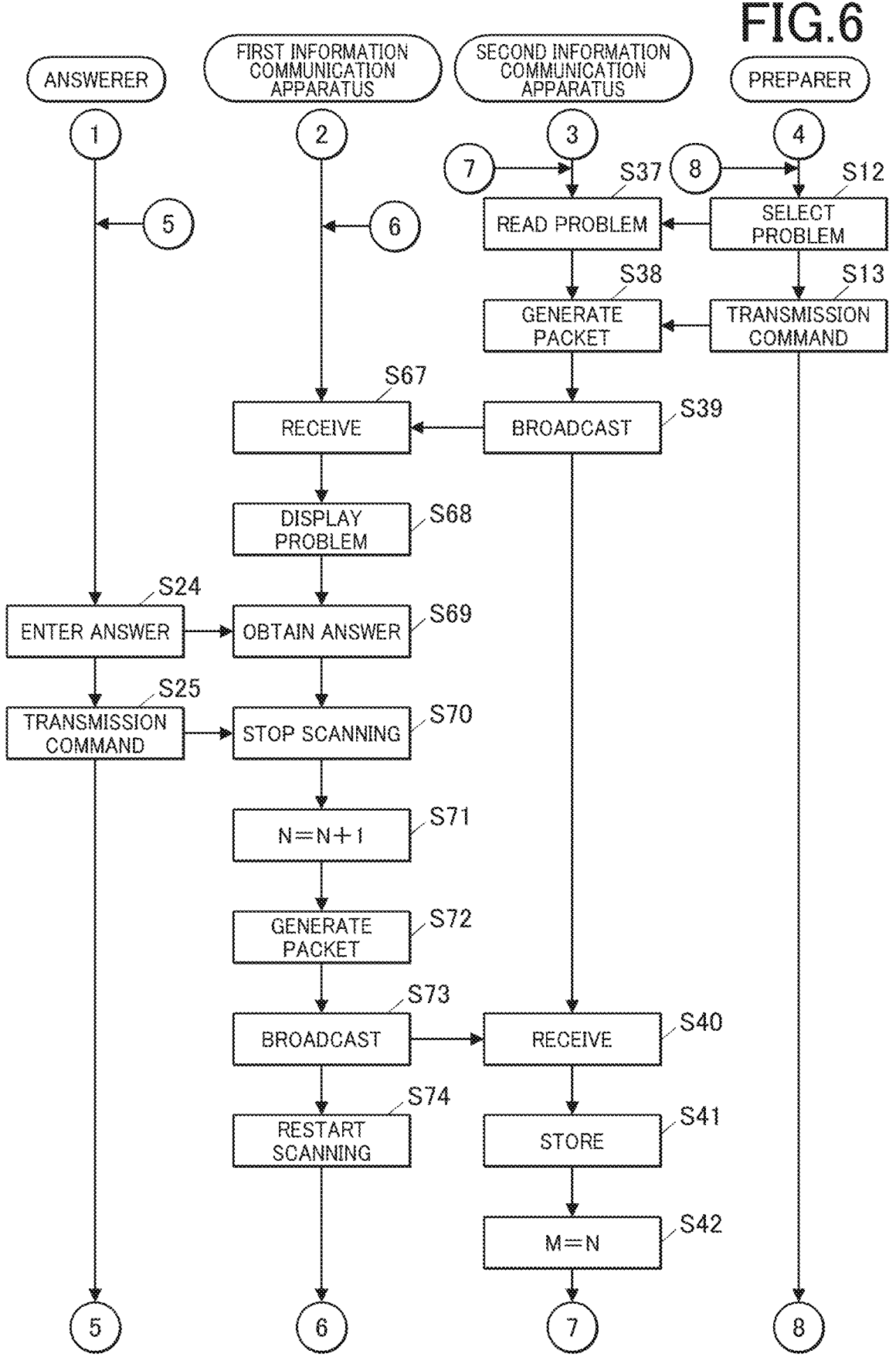
FIG. 6 is a continuation of FIG. 5, showing a sequence of actions that are performed by the preparer, a sequence of actions that are performed by each answerer, a sequence of processes that are performed by the controller of each first information communication apparatus, and a sequence of processes that are performed by the controller of the second information communication apparatus.

Referring to FIG. 5 and FIG. 6, a method for a preparer using his/her own parent unit 20 to transmit a problem to answerers and then receive answers from the answerers will be described. Further, a sequence of processes that the application program 23a of the parent unit 20 causes the controller 21 of the parent unit 20 to perform will be described. Still further, a method for each answerer using his/her own child unit 10 to receive the problem from the preparer and then transmit an answer to the preparer will be described. Yet further, a sequence of processes that the program 13a of each child unit 10 causes the controller 11 thereof to perform will be described. FIG. 5 and FIG. 6 show a sequence of actions that are performed by the preparer, a sequence of actions that are performed by each answerer, a sequence of processes that are performed by the controller 11 of each child unit 10, and a sequence of processes that are performed by the controller 21 of the parent unit 20.

A preparer makes an instruction (command) to boot up the application program 23a using the input device 24 of his/her own parent unit 20 (Step S11). When the controller 21 of the parent unit 20 receives the instruction, the controller 21 boots up the application program 23a (Step S31). Then, the controller 21 of the parent unit 20 controls and causes the transceiver 26 to perform scanning (Step S32). This puts the transceiver 26 in the state of being able to receive and demodulate packets that conform to the BLE standard. If the transceiver 26 receives a packet from an apparatus other than the child units 10, the controller 21 ignores the packet since the value stored in the type field of the packet is different from the determined value(s).

Each answerer presses a predetermined key of the input key 14 of his/her own child unit 10 to make an instruction (command) to boot up the program 13a (Step S21). When the controller 11 of the child unit 10 receives the instruction, the controller 11 boots up the program 13a (Step S61). Then, the controller 11 of the child unit 10 controls and causes the transceiver 16 to perform scanning (Step S62). This puts the transceiver 16 in the state of being able to receive and demodulate packets that conform to the BLE standard. If the transceiver 16 of a child unit 10 receives a packet from an apparatus other than the other child unit(s) 10 and the parent unit 20, the controller 11 ignores the packet since the value stored in the type field of the packet is different from the determined value(s).

Next, each answerer operates the input key 14 of his/her own child unit 10 to enter his/her unique number (which hereinafter may be referred to as an "answerer number") into the controller 11 (Step S22). The controller 11 of the child unit 10 obtains the answerer number in response to a signal(s) of the input key 14 (Step S63). Examples of the answerer number include an attendee number, an identification number, a registration number, a student number, a lecture-taker number, a seat number and an examinee number assigned to each answerer.

Thereafter, each answerer operates the transmission key 14a of his/her own child unit 10 to give a transmission command to the controller 11 (Step S23). When the controller 11 of the child unit 10 receives the transmission command, the controller 11 generates a registration packet such that the answerer number is stored in the data field thereof (Step S64). At the time, the controller 11 of the child unit 10 stores identification information identifying the child unit 10 in the advertiser's address field of the registration packet, and also stores the value representing "Registration of Child Unit" in the data type field of the registration packet. This registration packet is used for notification from the child unit 10 to the parent unit 20 about answerer's attendance.

The controller 11 of the child unit 10 transfers the registration packet to the transceiver 16 and controls the transceiver 16 to broadcast the registration packet (Step S65). Then, the transceiver 16 broadcasts the registration packet. The transceiver 26 of the parent unit 20 receives the registration packet, and accordingly the controller 21 of the parent unit 20 obtains the registration packet (Step S33). The controller 21 of the parent unit 20 associates the identification information and the answerer number, which are stored in the registration packet, with one another, and stores these in the memory 22 or the storage 23 (Step S34). This allows the controller 21 to recognize a correspondence between pieces of identification information and answerer numbers of the respective child units 10.

When the parent unit 20 receives the registration packet from each child unit 10, the controller 21 of the parent unit 20 sets, for each child unit 10, a reception count value M and a problem count value to zero expressed as "00000000" in bits of one byte and stores these in the memory 22 or the storage 23 (Step S35). In the memory 22 or the storage 23, each reception count value M is associated with one or both of the identification information and the answerer number. Thus, the reception count value M is assigned to each child unit 10. The reception count value M is reception information that is first status information on reception of a second packet by the parent unit 20, the second packet containing answer data. More specifically, the reception count value M represents the number of times the parent unit 20 has received the second packet containing answer data broadcast by the child unit 10 to which the reception count value M is assigned. The reception count value M and the problem count value may each have a data length of two bytes or more.

Next, the controller 21 of the parent unit 20 starts periodic broadcasting (Step S36). The periodic broadcasting is for the parent unit 20 to notify the child units 10 about the number of times the parent unit 20 has received the second packet from each child unit 10. The periodic broadcasting will be detailed later.

Meanwhile, after the transceiver 16 of each child unit 10 broadcasts the registration packet, the controller 11 thereof sets a transmission count value N to zero expressed as "00000000" in bits of one byte (Step S66). The transmission count value N is transmission information that is second status information on transmission of a second packet by the child unit 10, the second packet containing answer data. More specifically, the transmission count value N represents the number of times the child unit 10 has broadcast the second packet. The transmission count value N may have a data length of two bytes or more.

Thereafter, when the preparer selects problem data 23*b* from among the plurality of problem data 23*b* using the input device 24 of the parent unit 20 (Step S12), the controller 21 reads the selected problem data 23*b* (Step S37). The preparer may perform a gesture on/with the input device 24, and the controller 21 may recognize and obtain problem data 23*b* corresponding to the contents of the gesture.

Next, the preparer operates the input device 24 to give a transmission command to the controller 21 (Step S13). Then, the controller 21 increases the problem count value by one and generates a first packet such that the selected problem data 23*b* is stored in the data field thereof (Step S38). At the time, the controller 21 stores the value representing "From Parent Unit to Child Unit" in the data type field of the first packet, and also stores the problem count value in the count field of the first packet. In addition, the controller 21 stores identification information identifying the parent unit 20 in the advertiser's address field of the first packet. Since the first packet contains the problem data 23*b*, the first packet may be referred to as a "problem packet".

Next, the controller 21 of the parent unit 20 transfers the first packet to the transceiver 26 and controls the transceiver 26 to broadcast the first packet (Step S39). Then, the transceiver 26 broadcasts the first packet. The transceiver 16 of each child unit 10 receives the first packet, and accordingly the controller 11 thereof obtains the first packet (Step S67). At the time, no apparatus other than the parent unit 20 performs broadcasting. Hence all the child units 10 will succeed in receiving the first packet. However, if any one or more of the child units 10 fail to receive the first packet, the display device 15 of such a child unit(s) 10 displays no problem in Step S68 described below, and therefore the answerer (i.e., user of the child unit 10) can recognize failure of reception of the first packet and request the preparer to retransmit the problem. When the preparer gives a transmission command again to the controller 21 of the parent unit 20 in response to the answerer's request, the controller 21 controls the transceiver 26 to rebroadcast the first packet.

When each child unit 10 successfully receives the first packet, the controller 11 thereof causes the display device 15 to display a problem based on the problem data 23*a* contained in the first packet (Step S68).

When each answerer operates the input key 14 of his/her own child unit 10 to enter an answer (Step S24), the controller 11 thereof recognizes and obtains answer data corresponding to the contents of the operation (Step S69).

Next, each answerer operates the transmission key 14*a* of his/her own child unit 10 to give a transmission command to the controller 11 thereof (Step S25). When the controller 11 of the child unit 10 receives the transmission command, the controller 11 controls and causes the transceiver 16 to stop scanning (Step S70).

Next, the controller 11 of the child unit 10 increases transmission count value N by one (Step S71).

Next, the controller 11 of the child unit 10 generates a second packet such that the answer data is stored in the data field thereof (Step S72). At the time, the controller 11 of the child unit 10 stores identification information identifying the child unit 10 in the advertiser's address field of the second packet. In addition, the controller 11 stores the value representing "From Child Unit to Parent Unit" in the data type field of the second packet and also stores the transmission count value N in the count field of the second packet. Since the second packet contains the answer data, the second packet may be referred to as an "answer packet".

Next, the controller 11 of the child unit 10 transfers the second packet to the transceiver 16 and controls the transceiver 16 to broadcast the second packet (Step S73). Then, the transceiver 16 broadcasts the second packet. Next, the controller 11 of the child unit 10 controls and causes the transceiver 16 to perform scanning (Step S74).

When the transceiver 26 of the parent unit 20 receives the second packet from each child unit 10, the controller 21 of the parent unit 20 obtains the second packet accordingly (Step S40). On the basis of the identification information stored in the advertiser's address field of the second packet, the controller 21 of the parent unit 20 can recognize the child unit 10 from which the second packet has been transmitted, namely, the source of the second packet. On the basis of the value representing "From Child Unit to Parent Unit" stored in the data type field of the second packet, the controller 21 of the parent unit 20 can recognize that the second packet has been transmitted from one of the child units 10. When recognizing these, the controller 21 reads the answer data stored in the data field of the second packet, associates the answer data with the identification information and the answerer number stored in the memory 22 or the storage 23, and stores these there (Step S41).

Next, the controller 21 applies the transmission count value N stored in the count field of the second packet to the reception count value M assigned to the child unit 10, thereby updating the reception count value M for the child unit 10 in the memory 22 or the storage 23 (Step S42). Since the transmission count value N has been increased by one in Step S71, the reception count value M is also increased by one in Step S42. As described above, in the memory 22 or the storage 23, the reception count value M is associated with one or both of the identification information and the answerer number, and accordingly the reception count value M is assigned to the child unit 10.

Thereafter, each time the preparer selects problem data and gives a transmission command to the controller 21 as in Steps S12 and S13, the controller 21 of the parent unit 20 performs the processes of Steps S37 to S39, and the controller 11 of each child unit 10 performs the processes of Steps S67 and S68. Each time each answerer enters an answer and gives a transmission command to the controller 11 of his/her own child unit 10 as in Steps S24 and S25 in response to receiving the problem data, the controller 11 of each child unit 10 performs the processes of Steps S69 to S74, and the controller 21 of the parent unit 20 performs the processes of Steps S40 to S42.

When the parent unit 20 successfully receives answer data from a certain child unit 10, the controller 21 of the parent unit 20 performs the processes of Steps S40 to S42 for the child unit 10 as described above. Therefore, the reception count value M assigned to this child unit 10 is equal to the transmission count value N increased by the controller 11 of the child unit 10. In contrast, when the parent unit 20 fails to receive answer data from a certain child unit 10, the controller 21 of the parent unit 20 does not perform the processes of Steps S40 to S42 for the child unit 10. Therefore, the reception count value M assigned to this child unit 10 is different from the transmission count value N increased by the controller 11 of the child unit 10.

Figure 7:
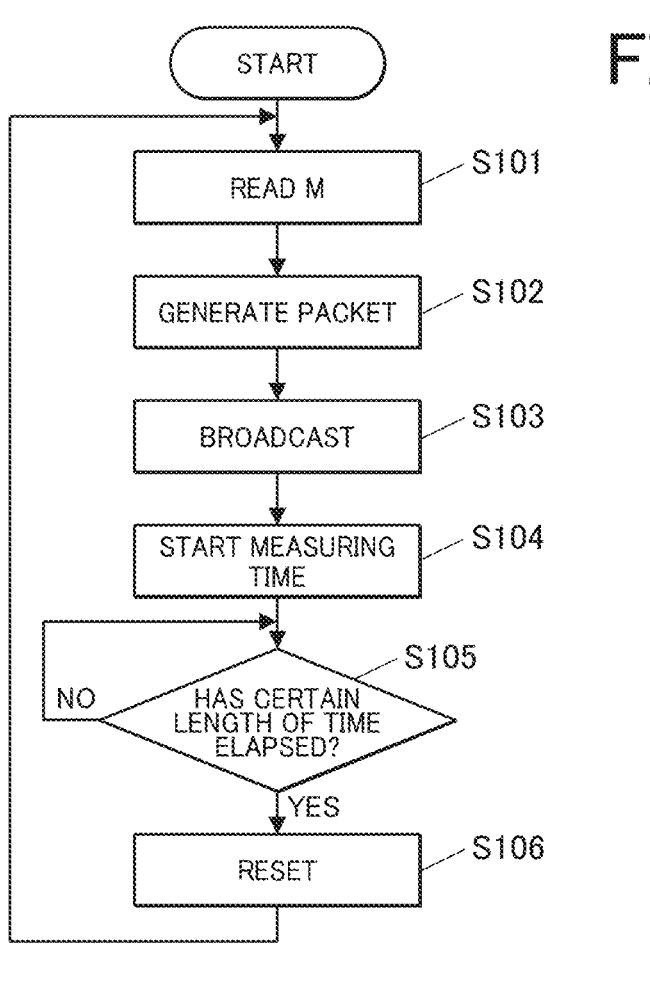
FIG. 7 shows a sequence of processes that are performed by the controller of the second information communication apparatus.
Figure 8:
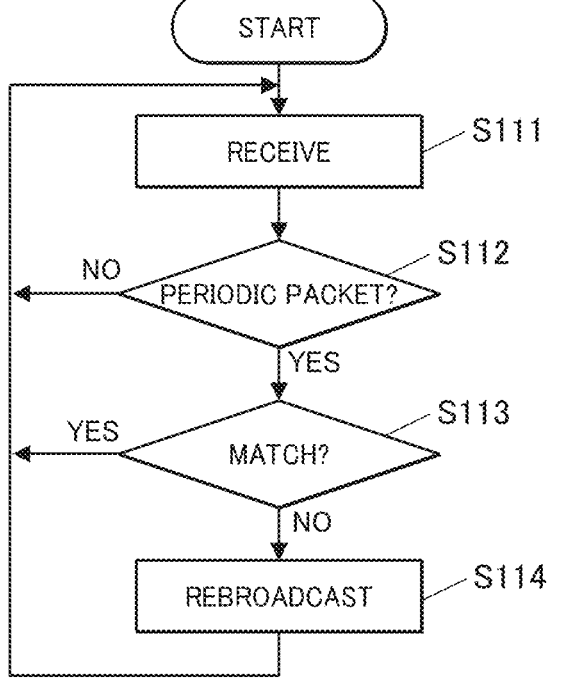
FIG. 8 shows a sequence of processes that are performed by the controller of each first information communication apparatus.

For notification from the parent unit 20 to the child units 10 about success or failure of reception of answer data by the parent unit 20, the answer data being transmitted from the respective child units 10, the controller 21 of the parent unit 20 performs processes shown in FIG. 7 in parallel with the processes of Steps S36 to S42, and the controller 11 of each child unit 10 performs processes shown in FIG. 8 in parallel with the processes of Steps S67 to S74. The series of the processes shown in FIG. 7 is started by the controller 21 in Step S36. Hereinafter the processes shown in FIG. 7 will be detailed.

First, the controller 21 of the parent unit 20 reads the reception count value M assigned to each child unit 10 from the memory 22 or the storage 23 (Step S101).

Next, the controller 21 of the parent unit 20 stores the identification information identifying the parent unit 20 in the advertiser's address field of a periodic packet, and also stores the value representing "Periodic Broadcasting" in the data type field of the periodic packet. At the time, the controller 21 extracts the least significant bit and the second least significant bit of each reception count value M that the controller 21 has read in Step S101, and generates the periodic packet such that the least significant bit and the second least significant bit of each reception count value M are stored in the data field of the periodic packet (Step S102). Hereinafter the least significant bit may be abbreviated as "LSB", and the second least significant bit may be abbreviated as "SLSB". If the reception count value M is "0", the value of the LSB and the value of the SLSB are "0" and "0", respectively. If the reception count value M is "1", the value of the LSB and the value of the SLSB are "0" and "1", respectively. If the reception count value M is "2", the value of the LSB and the value of the SLSB are "1" and "0", respectively. If the reception count value M is "3", the value of the LSB and the value of the SLSB are "1" and "1", respectively.

Figure 9:
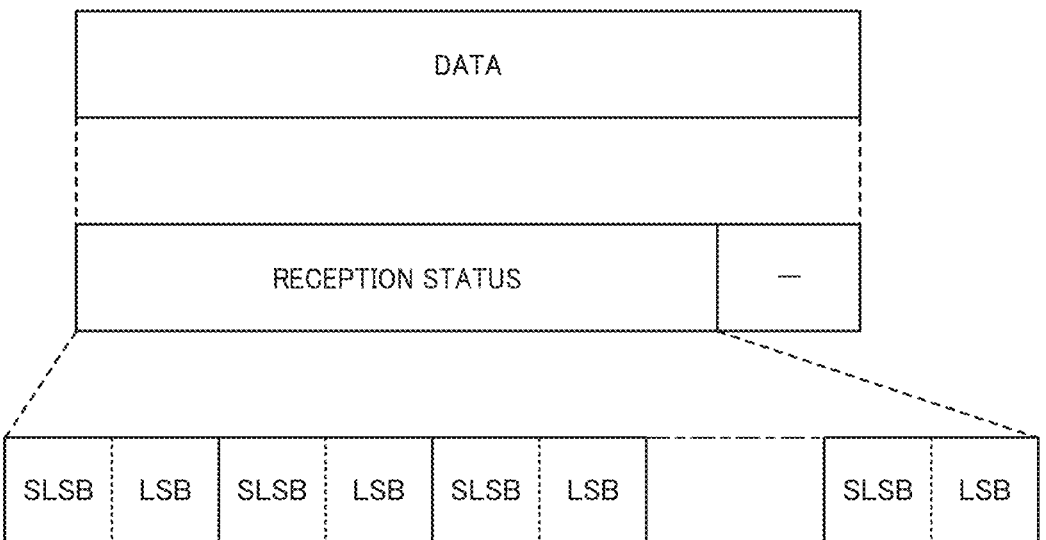
FIG. 9 shows the structure of the data field of a periodic packet that is a packet periodically broadcast by the second information communication apparatus.

FIG. 9 shows the structure of the data field of the periodic packet. The data field of the periodic packet includes, for example, a 13-, 14- or 15-octet reception status field. The data length of the reception status field is not limited to 13, 14 or 15 octets, and is determined on the basis of the expected number of child units 10. In the reception status field, the LSB and the SLSB of the reception count value M assigned to each child unit 10 are laid out and stored. The storage places where the LSB and the SLSB are stored are assigned to each child unit 10. In other words, the storage places of the LSB and the SLSB identify a child unit 10 and a reception count value M assigned to the child unit 10.

The controller 21 may store, in the reception status field, the first to third, first to fourth, third to fifth or all bits of the reception count value M assigned to each child unit 10, for example. Since the data length of the data field is limited, as the number of bits of each reception count value M stored in the reception status field is larger, the expected number of child units 10 is smaller.

After generating the periodic packet, the controller 21 of the parent unit 20 transfers the periodic packet to the transceiver 26 and controls the transceiver 26 to broadcast the periodic packet (Step S103). Then, the transceiver 26 broadcasts the periodic packet.

Next, the controller 21 of the parent unit 20 starts measuring time (Step S104). The controller 21 of the parent unit 20 keeps measuring time until the time reaches a certain length of time (Step S105). When the certain length of time has elapsed since the start of the time measurement (Step S105; YES), the controller 21 of the parent unit 20 stops measuring time and resets the measured time to zero (Step S106). The controller 21 of the parent unit 20 then returns to Step S101. The controller 21 of the parent unit 20 repeatedly performs the series of the processes shown in FIG. 7, so that the parent unit 20 repeatedly transmits/broadcasts the periodic packet.

Referring to FIG. 8, the processes that the controller 11 of each child unit 10 performs in parallel with the processes of Steps S67 to S74 will be described.

First, each time the transceiver 16 of each child unit 10 receives a packet (Step S111), the controller 11 thereof determines whether the packet is the periodic packet (Step S112). If the value stored in the data type field of the packet is the value representing "Periodic Broadcasting", the controller 11 determines that the packet is the periodic packet (Step S112; YES). If the value stored in the data type field of the packet is not the value representing "Periodic Broadcasting", the controller 11 determines that the packet is not the periodic packet (Step S112; NO).

If the controller 11 of each child unit 10 determines that the packet is the periodic packet (Step S112; YES), the controller 11 thereof compares the LSB and the SLSB in the storage places assigned to the child unit 10 in the reception status field of the periodic packet with the LSB and the SLSB of the transmission count value N, respectively (Step S113). The transmission count value N is the value increased in Step S71. If the parent unit 20 has failed to receive answer data from the child unit 10, the LSB and the SLSB of the reception count value M assigned to the child unit 10 in the reception status field of the periodic packet are different from the LSB and the SLSB of the transmission count value N of the child unit 10, respectively. If the controller 11 of the child unit 10 determines so, namely, that the LSB and the SLSB of the reception count value M assigned to the child unit 10 in the reception status field of the periodic packet are different from the LSB and the SLSB of the transmission count value N of the child unit 10 (Step S113; NO), the controller 11 transfers the second packet generated in Step S72 to the transceiver 16 and controls the transceiver 16 to rebroadcast the second packet (Step S114). Then, the transceiver 16 rebroadcasts the second packet. When the parent unit 20 successfully receives the rebroadcast answer data (i.e., second packet), the controller 21 of the parent unit 20 performs the processes of Steps S40 to S42. Therefore, the reception count value M assigned to the child unit 10 that has retransmitted/rebroadcast the second packet becomes equal to the transmission count value N of the child unit 10 (Step S42).

The process of Step S114 is not limited to controlling the transceiver 16 to rebroadcast the second packet. For example, a predetermined notifier (e.g., display device 15) may notify the user of the child unit 10 that the parent unit 20 has failed to receive the answer data, or may urge the user thereof to retransmit the answer data by, for example, displaying a message thereof.

If the parent unit 20 has successfully received answer data from the child unit 10, the LSB and the SLSB of the reception count value M assigned to the child unit 10 in the reception status field of the periodic packet match the LSB and the SLSB of the transmission count value N of the child unit 10, respectively. If the controller 11 of the child unit 10 determines so, namely, that the LSB and the SLSB of the reception count value M assigned to the child unit 10 in the reception status field of the periodic packet match the LSB and the SLSB of the transmission count value N of the child unit 10 (Step S113; YES), the controller 11 returns to Step S111 without causing the transceiver 16 to retransmit/rebroadcast the second packet.

As described above, the child unit(s) 10 includes the controller 11 and the transceiver 16. When the transceiver 16 receives the periodic packet containing the LSB and the SLSB of the reception count value M as the first status information on reception of answer data by the parent unit 20 (Step S111 and Step S112; YES), the controller 11 compares the LSB and the SLSB of the transmission count value N as the second status information on transmission of the answer data by the child unit 10 with the LSB and the SLSB of the reception count value M (Step S113). The LSB and the SLSB of the transmission count value N not matching the LSB and the SLSB of the reception count value M means that the parent unit 20 has failed to receive the second packet. Therefore, if the LSB and the SLSB of the transmission count value N do not match the LSB and the SLSB of the reception count value M according to their comparison, the controller 11 causes the transceiver 16 to rebroadcast the second packet (Step S114). Thus, the parent unit 20 can get an opportunity (ies) to receive the second packet. This can prevent the parent unit 20 from failing to receive answer data from each child unit 10 even if there are many child units 10.

The first status information is information based on the reception count value M. The reception count value M is the one updated to the transmission count value N (Step S42), which represents the number of times the child unit 10 has transmitted the answer data, the transmission count value N being received by the parent unit 20 together with the answer data. The second status information is information based on the transmission count value N (Step S71), which represents the number of times the child unit 10 has transmitted the answer data, the transmission count value N being transmitted by the child unit 10 together with the answer data. Therefore, the child unit 10 can determine whether the parent unit 20 has succeeded in receiving the second packet by comparing the LSB and the SLSB of the transmission count value N with the LSB and the SLSB of the reception count value M stored in the reception status field of the periodic packet.

In the reception status field of the periodic packet, the LSB and the SLSB of the reception count value M for each child unit 10 are stored. The data length of the LSB and the SLSB of the reception count value M is shorter than the data length of the reception count value M. Hence, although the data length of the periodic packet is limited, a single periodic packet can have pieces of information on success or failure of reception of second packets by the parent unit 20, the second packets being transmitted from many child units 10. Therefore, every time the parent unit 20 broadcasts the periodic packet, the parent unit 20 can notify many child units 10 whether the parent unit 20 has succeeded in receiving (i.e., has failed to receive) the second packets transmitted from the respective child units 10.

The parent unit 20 includes the controller 21 and the transceiver 26. When the transceiver 26 receives the second packet containing the transmission count value N as the second status information on transmission of answer data by each of the child units 10, the controller 21 generates, for each of the child units 10, the reception count value M on the basis of the transmission count value N, the reception count value M being the first status information on reception of the answer data by the parent unit 20 (Step S42). In parallel with this, the controller 21 causes the transceiver 26 to broadcast the periodic packet containing the LSBs and the SLSBs of the reception count values M regarding all the child units 10 (Step S103). Therefore, every time the parent unit 20 broadcasts the periodic packet, the parent unit 20 can notify the child units 10 whether the parent unit 20 has succeeded in receiving the second packets transmitted from the respective child units 10.

The controller 21 causes the transceiver 26 to broadcast the periodic packet containing the LSBs and the SLSBs of the reception count values M regarding all the child units 10 (Step S103). Therefore, the parent unit 20 does not need to communicate with the child units 10 individually.

The controller 11 of each child unit 10 controls the transceiver 16 to broadcast the registration packet (Step S65). In the advertiser's address field of the registration packet, the identification information identifying the child unit 10 is stored, and in the data field of the registration packet, the answerer number is stored. When the parent unit 20 receives the registration packet, the controller 21 recognizes the correspondence between the identification information and the answerer number, which are assigned to each child unit 10. Therefore, the controller 21 of the parent unit 20 can identify the child unit 10 from the registration packet. Further, in the advertiser's address field of the second packet, the identification information identifying the child unit 10 is stored. Therefore, the controller 21 can identify the child unit 10 that is the source of the second packet. Thus, the controller 21 can manage the reception count values M for the respective child units 10, and also can identify the storage places of the LSBs and the SLSBs of the respective reception count values M in the reception status field of the periodic packet. Therefore, although the transmission by each child unit 10 and the transmission by the parent unit 20 are each broadcasting with no destination specified, the parent unit 20 can notify the child units 10 whether the parent unit 20 has succeeded in receiving the second packets transmitted from the respective child units 10.

In the above embodiment, the preparer transmits the first packet containing problem data using the parent unit 20, and in response to this, the answerers transmit the second packets containing their respective answer data using their respective child units 10. However, the answerers may spontaneously transmit the second packets containing their respective answer data to, for example, predetermined or previously obtained problem data using their respective child units 10. In other words, the actions/processes of Steps S12, S13, S37, S38, S39, S67 and S68 may be omitted.

Further, although the answerers enter answers in Step S24 in the above embodiment, they may enter information other than answers. In other words, data stored in the data field of each second packet may be information other than answer data. For example, it is possible that each answerer presses one of the push keys of the input key 14, the controller 11 recognizes an input or a command corresponding to the push key, and the input or the command is stored in the data field of the second packet.

The invention claimed is:

1. An information communication apparatus comprising:
   a communicator; and
   a processor,
   wherein in response to the communicator receiving, from a source, a periodic packet including one reception information that is information on reception of predetermined information from the information communication apparatus by the source and another reception information that is information on reception of predetermined information from another information communication apparatus by the source, the processor is configured to:
      determine whether transmission information that is information on transmission of the predetermined information by the information communication apparatus matches the one reception information, and
   wherein:
      the periodic packet includes a reception status field comprising a plurality of storage places respectively corresponding to a plurality of information communication apparatuses, including the information communication apparatus and the another information communication apparatus; and each storage place in the reception status field is associated with identification information corresponding to the respective information communication apparatus.

2. The information communication apparatus according to claim 1, wherein in response to the transmission information not matching the reception information, the processor is configured to perform at least one of (i) causing a notifier to notify a user that the transmission information does not match the reception information and (ii) causing the communicator to retransmit the predetermined information.

3. The information communication apparatus according to claim 1, wherein the reception information is information based on a reception count value representing a number of times the information communication apparatus has transmitted the predetermined information, the number of times being received by the source together with the predetermined information, and wherein the transmission information is information based on a transmission count value representing the number of times the information communication apparatus has transmitted the predetermined information, the number of times being transmitted by the information communication apparatus together with the predetermined information.

4. The information communication apparatus according to claim 3, wherein at least one of the reception information and the transmission information is part of a value of the number of times the information communication apparatus has transmitted the predetermined information.

5. The information communication apparatus according to claim 1, wherein the processor is configured to extract, from the reception status field of the periodic packet, the reception information corresponding to the information communication apparatus.

6. The information communication apparatus according to claim 5, wherein, in response to the transmission information not matching the extracted reception information, the processor is configured to retransmit the predetermined information.

7. A non-transitory computer-readable storage medium storing a program that causes a computer of an information communication apparatus including a communicator to:

in response to the communicator receiving, from a source, a periodic packet including one reception information that is information on reception of predetermined information from the information communication apparatus by the source and another reception information that is information on reception of predetermined information from another information communication apparatus by the source, determine whether transmission information that is information on transmission of the predetermined information by the information communication apparatus matches the one reception information, wherein:

the periodic packet includes a reception status field comprising a plurality of storage places respectively corresponding to a plurality of information communication apparatuses, including the information communication apparatus and the another information communication apparatus; and each storage place in the reception status field is associated with identification information corresponding to the respective information communication apparatus.

8. A communication system comprising:

a first information communication apparatus including a first communicator and a first processor;

at least one second information communication apparatus including a second communicator and a second processor; and a third information communication apparatus including a third communicator and a third processor, wherein in response to the third communicator receiving transmission information that is second status information on transmission of predetermined information by each of the first information communication apparatus and the second information communication apparatus, the third processor is configured to generate reception information based on the transmission information for each of the first information communication apparatus and the second information communication apparatus, the reception information being first status information on reception of the predetermined information by the third information communication apparatus, wherein the third processor is configured to cause the third communicator to periodically transmit a periodic packet including the reception information regarding all of the first information communication apparatus and the second information communication apparatus, wherein in response to the first communicator receiving the periodic packet from the third information communication apparatus, the first processor is configured to extract the reception information corresponding to the first information communication apparatus and compare the transmission information with the extracted reception information of the first information communication apparatus, and wherein;

in response to the transmission information not matching the reception information of the first information communication apparatus, the first processor is configured to cause the first communicator to retransmit the predetermined information;

the third processor is configured to generate the periodic packet including a reception status field comprising a plurality of storage places respectively corresponding to the first information communication apparatus and the at least one second information communication apparatus; and each storage place in the reception status field is associated with identification information corresponding to the respective information communication apparatus.

9. The communication system according to claim 8, wherein the first processor is configured to extract, from the reception status field of the periodic packet, the reception information corresponding to the first information communication apparatus based on identification information corresponding to each information communication apparatus.

10. The communication system according to claim 9, wherein, in response to the transmission information not matching the extracted reception information, the first processor is configured to retransmit the predetermined information.

11. A non-transitory computer-readable storage medium storing a program that causes a computer of an information communication apparatus including a communicator to:

in response to the communicator receiving transmission information that is second status information on transmission of predetermined information by each of a plurality of other apparatuses, generate reception information based on the transmission information for each of the plurality of other apparatuses, the reception information being first status information on reception of the predetermined information by the information communication apparatus;

cause the communicator to periodically transmit a periodic packet including the reception information regarding all the plurality of other apparatuses;

in response to the communicator receiving a periodic packet from another apparatus, extract, from the received periodic packet, the reception information corresponding to the information communication apparatus; and generate the reception information in a reception status field of the periodic packet, the reception status field comprising a plurality of storage places respectively corresponding to the plurality of other apparatuses, wherein each storage place in the reception status field is associated with identification information corresponding to the respective information communication apparatus.

12. The non-transitory computer-readable storage medium according to claim 11, wherein the program further causes the periodic packet to include reception information in a format that enables each of the plurality of other apparatuses to determine whether transmission information associated with that apparatus matches the corresponding reception information, and to retransmit the predetermined information in response to the transmission information not matching the reception information.

\* \* \* \* \*